United States Patent [19]

Weisrock

[11] 4,440,651

[45] Apr. 3, 1984

[54] USE OF PEROXIDE IN WATERFLOOD OIL RECOVERY

[75] Inventor: William P. Weisrock, Broken Arrow, Okla.

[73] Assignee: Standard Oil Company, Chicago, Ill.

[21] Appl. No.: 319,336

[22] Filed: Nov. 9, 1981

Related U.S. Application Data

[63] Continuation-in-part of Ser. No. 184,831, Sep. 8, 1980, abandoned.

[51] Int. Cl.³ .............................................. E21B 43/22
[52] U.S. Cl. ............................... 252/8.55 D; 166/274; 166/309
[58] Field of Search ................ 252/8.55 D; 166/273, 166/274, 309, 275

[56] References Cited

U.S. PATENT DOCUMENTS

| | | | |
|---|---|---|---|
| 3,298,436 | 1/1967 | McCardell | 166/273 |
| 3,330,347 | 7/1967 | Brown et al. | 166/273 |
| 3,344,858 | 10/1967 | Gilchrist et al. | 166/273 |
| 3,757,861 | 9/1973 | Routson | 166/273 |
| 4,166,038 | 8/1979 | Stournas | 166/274 X |
| 4,216,097 | 8/1980 | Stournas | 252/8.55 |

*Primary Examiner*—Herbert B. Guynn
*Attorney, Agent, or Firm*—Scott H. Brown; Fred E. Hook

[57] ABSTRACT

For enhanced recovery of petroleum, particularly for recovery of residual oil during conventional waterflooding, an aqueous solution of peroxide is injected into an oil-bearing formation. The concentration of peroxide in the aqueous solution ranges from about 0.1 to about 3.0 weight percent, and injection of peroxide need not be followed or accompanied by injection of alkaline solution. The aqueous peroxide solution may then be displaced toward the producing well or wells to sweep out residual oil.

9 Claims, No Drawings

USE OF PEROXIDE IN WATERFLOOD OIL RECOVERY

This application is a continuation-in-part of Ser. No. 184,831, filed Sept. 8, 1980, now abandoned.

BACKGROUND OF THE INVENTION

1. Setting of the Invention

In the practice of secondary recovery of petroleum from subterranean formations, waterflooding is commonly employed. In such operations water is injected down an input well and into the formation to displace oil from the formation towards a producing well through which the oil is recovered. Additives such as sodium carbonate or sodium hydroxide in waterfloods have been used to improve oil recovery. Additionally, surfactants have also been utilized to improve oil recovery. However, both techniques, although effective, are expensive and are applicable only to limited types of formations bearing special varieties of petroleum.

2. Pertinent Art

Pertinent art in the area is illustrated by U.S. Pat. No. 3,757,861 issued to Willis G. Routson on Sept. 11, 1973 and entitled "Oil Recovery Employing Peroxides and Alkalis". The process employed by Routson requires injection of an aqueous solution containing at least about 5% by weight of an inorganic peroxide in an amount of at least about 0.04 pore volume of the formation followed by or injected with an aqueous solution containing at least about 0.05% by weight of alkaline agent in an amount at least equal to that of the peroxide solution. This peroxide/alkaline agent pad was in turn forced through the formation by solutions of water containing mobility control agents such as xanthan gum. Peroxides and and alkalines in Routson are allowed to co-act and the products of reaction of the peroxide and the copolymer are maintained in the bank which is then displaced into the formation toward one or more producing walls.

Additional pertinent art is illustrated by U.S. Pat. Nos. 3,298,436, 3,330,347 and 3,344,858 which discloses production of surfactant compounds in situ in an oil bearing formation by the injection of an acid compound followed by a caustic solution. Such operations, however, are, as mentioned above, inherently expensive.

SUMMARY OF THE INVENTION

In accordance with the present invention, an improvement in recovery of fluid hydrocarbons such as petroleum from subterranean petroleum bearing formations may be realized by introducing into the formation an aqueous solution of peroxide, typically hydrogen peroxide, as an additive to the waterflood agent. In general, the invention is carried out in accordance with the usual practice of waterflooding whereby the waterflood agent containing the peroxide is introduced into the injection well and displaced through the formation toward one or more of the producing wells from which the petroleum is recovered.

In an additional method, the additive may be injected as a slug or pad (making up a small percentage of the pore volume) and subsequently followed by injection of a drive fluid.

DETAILED DESCRIPTION OF THE INVENTION

The method of the present invention will normally be practiced in oil fields which have been engineered for secondary recovery by conventional waterflooding. The present method may be employed as the secondary recovery method of choice or employed after conventional waterflooding has been carried out to the point where yields are no longer economically feasible although substantial amounts of petroleum are known to remain in the formation. In conventional waterflood operations, it is the standard practice to drill a number of wells to penetrate the oil bearing strata. At least one such well is employed for injecting fluids into the oil bearing strata and one or more wells spaced apart from each injection well are employed for producing oil displaced by the injected fluid. Since a plurality of wells are normally involved in any given oil field, it is usually possible from the study of core logs, production logs and the like to estimate the average porosity of the oil bearing strata and the amount of residual oil in place.

In carrying out the invention, an aqueous solution of between about 0.1 and about 3.0 weight percent peroxide is pumped into one or more injection wells and out into the oil-bearing formation. Weight percent of peroxide used throughout specification and claims is defined as the weight of $[-HO_2]$ divided by weight of the solution. The number of pore volumes of solution injected is controlled primarily by the economics. However, it has been found that once free gas generated during peroxide displacement breaks through at the production well, the recovery of oil is substantially reduced. Therefore, the injection of solution should not continue beyond gas breakthrough at the production well. The amount of solution injected can amount to up to about 2 or more pore volumes of the formation being treated.

Alternatively, an aqueous solution of peroxide may be injected into the formation through an injection well until a sufficient pressure is attained to force the solution into the outer regions of the formation surrounding the wellbore. The solution is then maintained therein for a sufficient period to allow reaction of the peroxide with the formation. Thereafter the pressure is relieved on the injection well and oil is produced back through the injection well from the formation.

One of the major benefits of this invention is since the peroxide is inexpensive and is used in limited concentrations, use in a continuous manner is economical. Furthermore, injection of the peroxide solution need not be accompanied with or followed by injection of an alkali solution, thus making the overall process even more economical.

In carrying out the slug method of this invention, an aqueous solution containing at least 0.1 weight percent of peroxide is pumped into one or more injection wells and out into the oil bearing formation until an amount of the solution has been injected corresponding to about 0.1 to about 0.5 pore volume and preferably about 0.25 pore volume of the formation to be treated. Thereafter, sufficient pressure may be applied to the injection well to push the solutions into and through the formation to displace the oil toward the production well or wells. Alternatively, after introduction of the peroxide, sufficient pressure may be applied to the injection well to push the respective solution into the formation and maintain same therein for a period sufficient for reaction to occur and thereafter the pressure is relieved and oil is produced through the injection well.

The waterflood agent containing peroxide in the slug form may be followed by suitable mobility control agents contained in an aqueous drive fluid. Preferred mobility control agents, solutions in water or brine of high molecular weight water soluble polymers having resistant properties, are defined in U.S. Pat. No. 3,282,337 which is hereby incorporated by reference. In this manner, optimal efficiency in recovery of residual oil is realized.

In preparing the solution of peroxide for the present method, it is desirable to test the source of water to be employed to assure that the water does not contain impurities which might decompose peroxide before it reaches the oil in place in the formation. In general, the water employed for preparing a peroxide solution should be relatively free of readily oxidizable ingredients such as emulsified petroleum and other organic matter, sulfide or sulfite ions, ferrous ions or the like. In some cases, it may be desirable to incorporate a neutral buffer or other preservative in the solution to assure that the peroxide reaches the oil bearing formation without decomposing. The water used may be fresh water or brine. The pH of the water is not critical. It is preferred, however, that the water be neutral or slightly alkaline. The polymer solution used in the slug method of the invention should also be unreactive with the peroxide additive.

It is believed that it is necessary that the peroxide reach the oil-bearing formation without decomposing since it is necessary for the peroxide to react with the formation rock to create a free gas as opposed to a dissolved gas in place, that is, in the formation.

The type of peroxides utilized in the method of the invention should liberate oxygen freely. The preferred peroxides include hydrogen peroxide and inorganic peroxides such as zinc and calcium peroxide since these peroxides liberate oxygen more freely. More preferably, hydrogen peroxide is used in this method. The exact amount of peroxides to be employed in a given solution will vary depending upon the nature of the formation to be treated, the nature of the petroleum contained therein, and most importantly the bottomhole pressure of the given formation. Good results are obtained when employing from about 0.1 to 3.0 weight percent of peroxide in a waterflood aqueous solution. The weight percent of peroxide is directly proportional to the pressure of the formation, that is, the higher the formation pressure, the higher the required peroxide concentration.

Performance of this peroxide containing solution may be increased by reduction of interfacial tension between the solution and the formation oil. Therefore, addition of effective amounts of surfactant to the solution will increase the effectiveness of the oil recovery. This invention is generally useful in shallow wells where the bottomhole pressure does not exceed 200 psi. This typically means wells having depths less than 500 ft. This limitation is due to economic considerations of concentration of peroxide since greater depth requires greater peroxide concentration.

The process of this invention, although useful on both oil-wet and water-wet formations, is more useful on water-wet formations.

The following Example illustrates the invention but is not to be construed as limiting same.

EXAMPLE

Cylindrical core samples about 2 inches in diameter by 12 inches in length cut from Berea sandstone of known porosity are mounted in Hassler core holders equipped with pressure fittings on opposite faces of the cores so that fluids can be forced lengthwise therethrough. The holders are maintained at 500 psig on the annulus. The cores are initially evacuated, flooded with carbon dioxide, re-evacuated, and saturated with a 2 N sodium chloride brine. The pore volume is then determined and the cores are injected with 2 pore volumes of the 2 N sodium chloride brine. Subsequently, the cores are equilibrated with 3000 ppm sodium chloride brine at 12 cc per hour for 12 hours. The cores are then oil flooded with a crude oil obtained from the Torchlight field near Basin, Wyoming, and the connate water saturation is determined. Cores are then waterflooded with a 3000 ppm brine test solution to residual oil saturation. A back pressure of 30 psig is maintained on the core and effluents are directed into a fraction collector or a gas-liquid separator. During these tests, the cores are continuously injected at 12 cc per hour with waterflood test solution. Test solutions consist of 5 ml of 30% $H_2O_2$ per liter of 3000 ppm brine (0.208% weight percent ($-HO_2$)). As shown in Table I, the recoveries at 2 pore volumes of produced fluid range from 17.9 to 28.6% of tertiary oil for an average of 24.2%.

TABLE I

| Run No. | Connate Water Saturation | Residual Oil Saturation | Final Oil Saturation |
|---|---|---|---|
| 1 | 38.9 | 35.1 | 28.8 |
| 2 | 44.3 | 29.4 | 21.7 |
| 3 | 43.9 | 28.0 | 20.0 |

Similar improvements can be obtained by using a solution having higher peroxide concentrations of 2.5 weight percent.

I claim:

1. A process for displacing crude oil within an oil-bearing formation penetrated by at least one injection well in fluid communication with at least one producing well, comprising injecting from about 0.1 to about 0.5 pore volume of aqueous fluid into said formation through said at least one injection well to move said oil to said at least one producing well, said volume of aqueous fluid containing from about 0.1 weight percent to about 3.0 weight percent peroxide.

2. A process for displacing oil within an oil bearing formation penetrated by at least one injection well in fluid communication with at least one producing well, said oil bearing formation being water wet, comprising injecting from about 0.1 to about 0.5 pore volume of aqueous fluid into said formation through said at least one injection well to move said oil to said at least one producing well, said volume of aqueous fluid containing between about 0.1 to about 3.0 weight percent peroxide.

3. A process for recovering fluid hydrocarbons from a subterranean formation which penetrated by a wellbore which comprises the steps of injecting into said formation through said wellbore in the absence of an accompanying or following injection of alkaline solution an aqueous fluid containing between about 0.1 and about 3.0 weight percent peroxide; and producing oil from said formation through said well-bore.

4. A process for displacing crude oil within an oil-bearing formation penetrated by at least one injection well in fluid communication with at least one producing well comprising injecting a volume of aqueous fluid into said formation through said at least one injection well to move said oil to said at least one producing well, said volume of aqueous fluid containing from about 0.1 to about 3.0 weight % peroxide, wherein injection of aqueous fluid is in the absence of an accompanying or following injection of alkaline solution.

5. A process for displacing crude oil within an oil-bearing subterranean formation having at least one injection well and at least one production well comprising injecting an aqueous fluid into said formation through said at least one injection well to displace said oil toward said at least one production well, said aqueous fluid comprising an aqueous solution containing about 0.1 to about 3.0 weight % of a peroxide wherein injection of said aqueous fluid is in the absence of an accompanying or following injection of alkaline fluid.

6. The process of claim 1, 2, 3, 4, or 5 wherein said peroxide is an inorganic peroxide.

7. The process of claim 4 wherein the peroxide is hydrogen peroxide.

8. The process of claim 1, 2, 3, 4, or 5 wherein said aqueous fluid contains from about 0.2 weight percent to about 2.4 weight percent peroxide.

9. The process of claim 4 or 5 wherein said oil-bearing formation is water-wet.

* * * * *